US012803990B2

(12) United States Patent
Greevy et al.

(10) Patent No.: US 12,803,990 B2
(45) Date of Patent: Nov. 17, 2026

(54) SYSTEM AND METHOD FOR SECURELY COMMUNICATING A TEXT MESSAGE CONTENT BETWEEN A SENDER AND A RECIPIENT

(71) Applicant: Paubox, Inc., San Francisco, CA (US)

(72) Inventors: Hoala Greevy, San Francisco, CA (US); Ben Ternes, San Francisco, CA (US); Matthew Smeraglia, San Francisco, CA (US)

(73) Assignee: Paubox, Inc., San Francisco, CA (US)

( * ) Notice: Subject to any disclaimer, the term of this patent is extended or adjusted under 35 U.S.C. 154(b) by 12 days.

(21) Appl. No.: 18/942,181

(22) Filed: Nov. 8, 2024

(65) Prior Publication Data

US 2025/0071122 A1 Feb. 27, 2025

Related U.S. Application Data

(63) Continuation-in-part of application No. 18/389,175, filed on Nov. 13, 2023, now Pat. No. 12,413,598,
(Continued)

(51) Int. Cl.
*H04L 9/40* (2022.01)
*H04L 51/212* (2022.01)

(52) U.S. Cl.
CPC .......... *H04L 63/123* (2013.01); *H04L 51/212* (2022.05); *H04L 63/0236* (2013.01);
(Continued)

(58) Field of Classification Search
CPC . H04L 63/123; H04L 51/212; H04L 63/0236; H04L 63/0281; H04L 63/0428; H04L 63/1408; H04L 63/168; H04L 51/48
See application file for complete search history.

(56) References Cited

U.S. PATENT DOCUMENTS

2004/0267625 A1* 12/2004 Feng ...................... G06Q 10/10 715/733
2007/0008574 A1* 1/2007 Henry ................ H04N 1/00244 358/1.15
(Continued)

FOREIGN PATENT DOCUMENTS

KR 20070055472 A * 5/2007 ....... H04N 21/25891
KR 20070092196 A * 9/2007 ......... H04L 61/4541
(Continued)

*Primary Examiner* — Shahriar Zarrineh
(74) *Attorney, Agent, or Firm* — Run8 Patent Group, LLC; Peter Miller

(57) ABSTRACT

One variation of the method includes: receiving an electronic communication sent by a sender and designating a recipient address associated with a recipient. The method includes, in response to association of the recipient address to insufficient communication security: generating an instance of a secure web portal; initializing a secure communication thread accessible within the secure web portal; populating the secure communication thread with contents of the electronic communication; associating access to the instance of the secure web portal and secure communication thread with a hyperlink; generating a notification including the hyperlink; and transmitting the notification to the recipient address in place of the first electronic communication. The method includes, in response to selection of the hyperlink: initializing the instance of the secure web portal to a web browser; and populating the instance of the secure web portal with the secure communication thread.

18 Claims, 7 Drawing Sheets

Related U.S. Application Data which is a continuation of application No. 17/842,347, filed on Jun. 16, 2022, now Pat. No. 11,856,001, which is a continuation of application No. 17/014,905, filed on Sep. 8, 2020, now Pat. No. 11,399,032, which is a continuation of application No. 15/683,246, filed on Aug. 22, 2017, now Pat. No. 10,805,311.

(60) Provisional application No. 63/677,096, filed on Jul. 30, 2024, provisional application No. 63/556,225, filed on Feb. 21, 2024, provisional application No. 63/547,761, filed on Nov. 8, 2023, provisional application No. 62/378,068, filed on Aug. 22, 2016.

(52) U.S. Cl.
CPC ...... *H04L 63/0281* (2013.01); *H04L 63/0428* (2013.01); *H04L 63/1408* (2013.01); *H04L 63/168* (2013.01)

(56) References Cited

U.S. PATENT DOCUMENTS

| | | | | |
|---|---|---|---|---|
| 2008/0092039 | A1* | 4/2008 | Brockway | G06F 16/958 715/272 |
| 2009/0157823 | A1* | 6/2009 | Price, III | H04L 51/214 726/1 |
| 2009/0183266 | A1* | 7/2009 | Tan | G06F 21/88 726/35 |
| 2009/0313320 | A1* | 12/2009 | Parsons | H04L 61/4511 709/203 |
| 2010/0186022 | A1* | 7/2010 | Oulid-Aissa | G06Q 30/02 719/318 |
| 2012/0190325 | A1* | 7/2012 | Abu-Hakima | H04L 12/1895 455/404.2 |
| 2012/0210126 | A1* | 8/2012 | Johnson | G06F 21/52 713/165 |
| 2013/0080775 | A1* | 3/2013 | Liebmann | H04L 63/0428 713/168 |
| 2014/0328256 | A1* | 11/2014 | Djukic | H04L 1/0045 370/329 |
| 2015/0339339 | A1* | 11/2015 | Mastrodonato | G06F 16/21 707/805 |
| 2016/0148236 | A1* | 5/2016 | Evdokimo | G06Q 30/08 705/26.3 |
| 2016/0232805 | A1* | 8/2016 | Gibson | G16H 20/10 |
| 2017/0214641 | A1* | 7/2017 | Mishra | G06F 40/166 |
| 2018/0232441 | A1* | 8/2018 | Lin | G06N 20/00 |
| 2024/0020151 | A1* | 1/2024 | Albero | H04L 63/108 |

FOREIGN PATENT DOCUMENTS

| | | | | |
|---|---|---|---|---|
| TW | I734044 B | * | 7/2021 | |
| WO | WO-2009049792 A1 | * | 4/2009 | H04L 51/063 |
| WO | WO-2010027964 A1 | * | 3/2010 | G06F 16/951 |

* cited by examiner

SYSTEM AND METHOD FOR SECURELY COMMUNICATING A TEXT MESSAGE CONTENT BETWEEN A SENDER AND A RECIPIENT

CROSS-REFERENCE TO RELATED APPLICATIONS

This application claims the benefit of U.S. Provisional Application Nos. 63/547,761, filed 8 Nov. 2023, 63/556,225, filed on 21 Feb. 2024, and 63/677,096, filed on 30 Jul. 2024, each of which is incorporated in its entirety by this reference.

This Application is also a continuation-in-part of U.S. patent application Ser. No. 18/389,175, filed on 13 Nov. 2023, which is a continuation application of U.S. patent application Ser. No. 17/842,347, filed on 16 Jun. 2022, which is a continuation application of U.S. patent application Ser. No. 17/014,905, filed on 8 Sep. 2020, which is a continuation application of U.S. patent application Ser. No. 15/683,246, filed on 22 Aug. 2017, which claims the benefit of U.S. Provisional Application No. 62/378,068, filed on 22 Aug. 2016, each of which are incorporated in their entireties by this reference.

TECHNICAL FIELD

This invention relates generally to the field of text message communications and more specifically to a new and useful method for securely communicating text message content between a sender and a recipient in the field of text message communications.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

Figure 2:
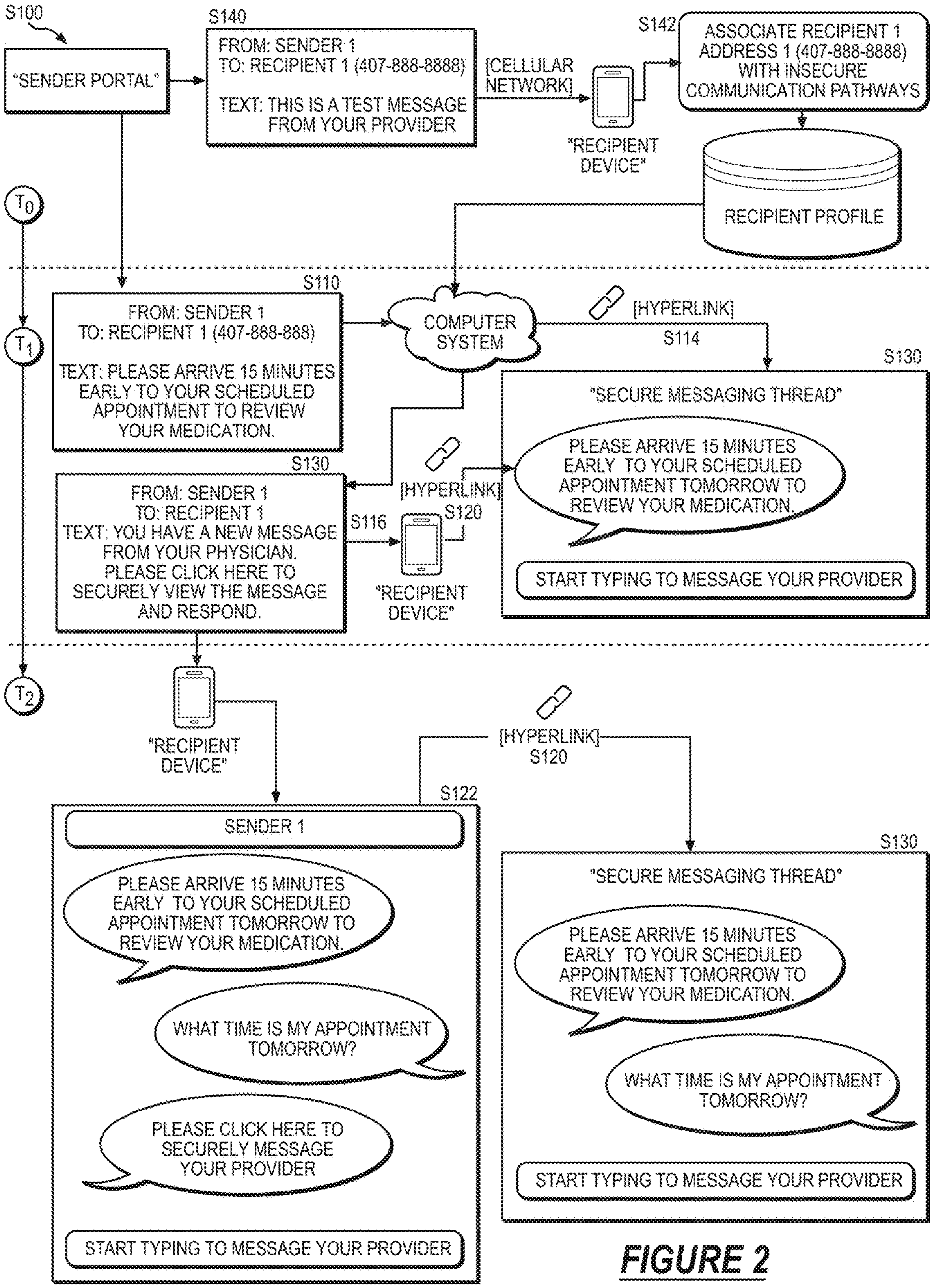
FIG. 2 is a schematic representation of the method.

As shown in FIG. 2, a method S100 includes receiving a first electronic communication in Block S110, the first electronic communication sent by a sender and designating a recipient address associated with a recipient in Block S110.

The method S100 also includes, in response to association of the recipient address with insufficient secure communications: initializing an instance of a secure web portal associated with the recipient; initializing a secure communication thread accessible within the instance of the secure web portal; populating the secure communication thread with contents of the first electronic communication; associating the instance of the secure web portal and the secure communication thread with a hyperlink in Block S114; generating a notification including the hyperlink in Block S130; populating the secure communication thread with contents of the first electronic communication; and transmitting the notification to the recipient address in place of the first electronic communication in Block S116.

The method S100 further includes, in response to selection of the hyperlink at a recipient device: serving the instance of the secure web portal via a web browser at the recipient device; and loading the secure communication thread into the instance of the secure web portal in Block S120.

1.1 Variation: Sender Portal

Figure 1A:
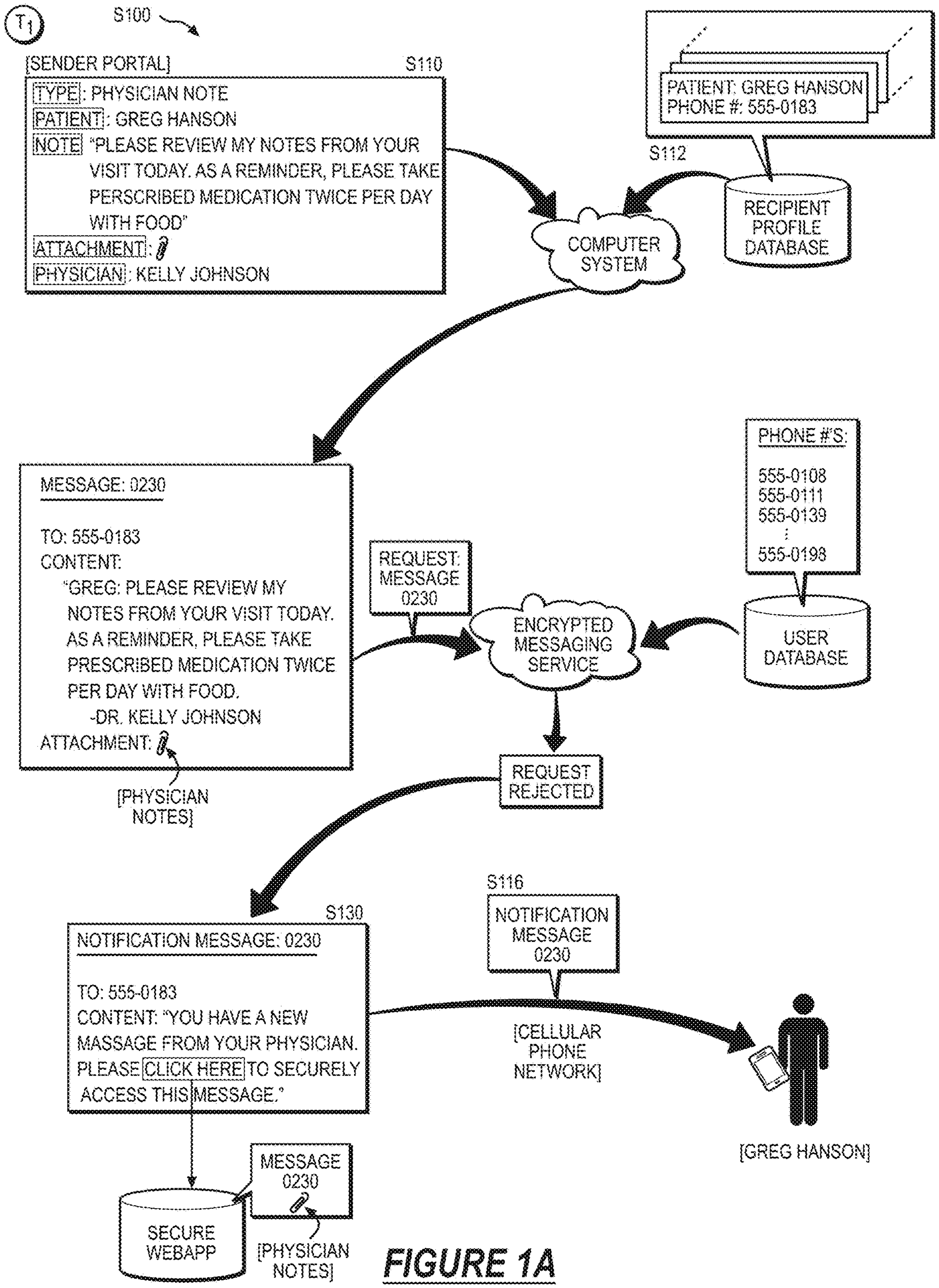
FIGS. 1A and 1B are schematic representations of a method.
Figure 1B:
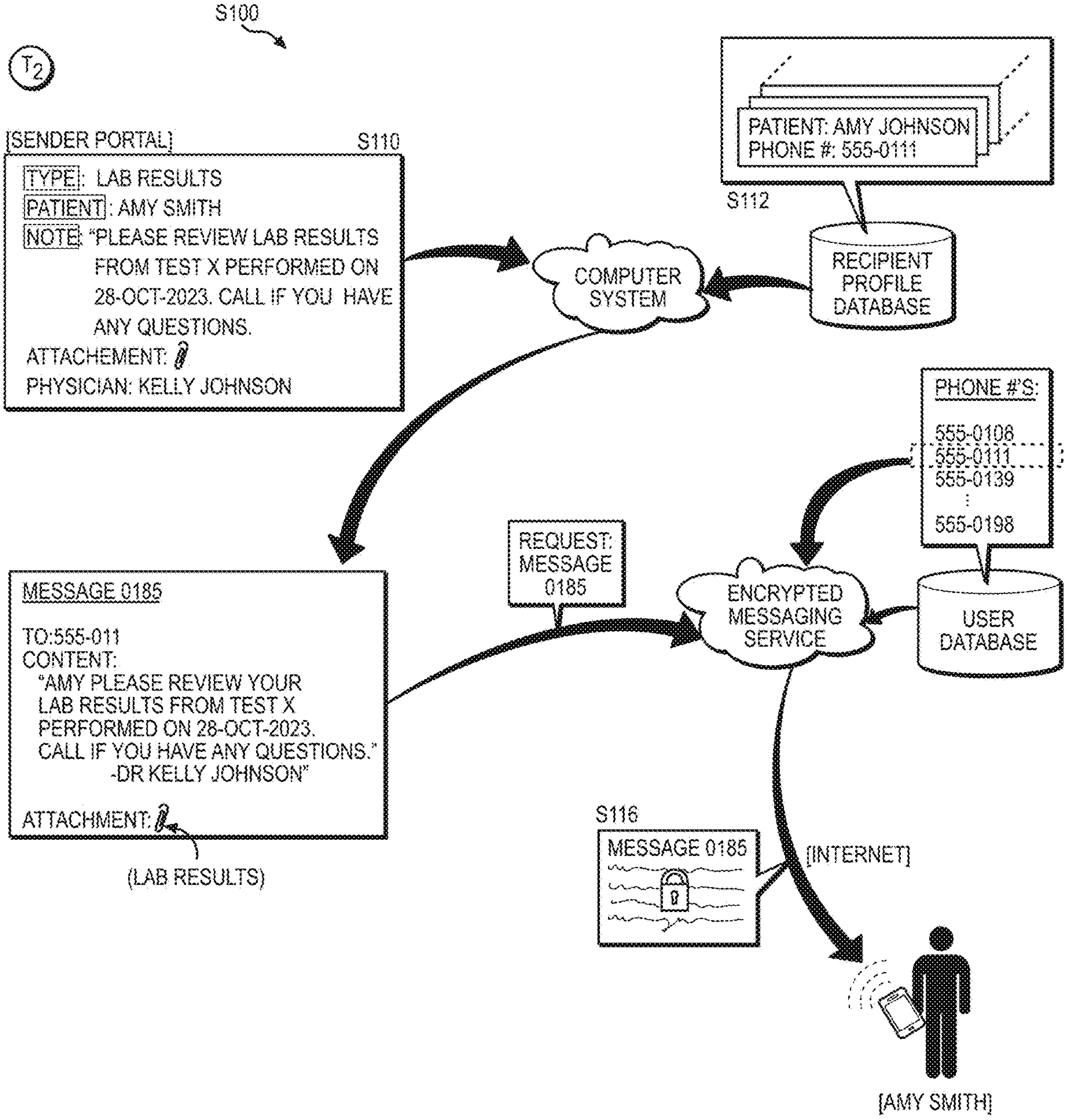

As shown in FIGS. 1A and 1B, one variation of the method S100 includes, during a first time period: receiving a first message request-including a first message intended for a first recipient and a first set of recipient information corresponding to the first recipient—from a sender via a sender portal in Block S110; and extracting a first device address corresponding to the first mobile phone from a first recipient profile affiliated with the first recipient based on the first set of recipient information in Block S112. The method S100 further includes, during the first time period, in response to transmission pathways supported by the first mobile device excluding an encrypted transmission pathway: generating a notification message including a hyperlink to a secure webpage containing content of the first message in Block S130; and authorizing transmission of the notification message to the first device address via an unencrypted transmission pathway in Block S116. The method S100 further includes, during a second time period: receiving a second message request-including a second message intended for a second recipient and a second set of recipient information corresponding to the second recipient—from the sender via the sender portal in Block S110; and extracting a second device address corresponding to the second mobile phone from a second recipient profile affiliated with the second recipient based on the second set of recipient information in Block S112. The method S100 further includes, in response to transmission pathways supported by the second mobile device including the encrypted transmission pathway, authorizing transmission of the second message to the second device address via the encrypted transmission pathway in Block S116.

1.2 Variation: Zero-Trust

One variation of the method S100 includes: receiving a first message request, from a sender portal, including a first electronic communication designating a first recipient and including a first set of recipient information corresponding to the first recipient in Block S110; extracting a first recipient address from a first recipient profile affiliated with the first recipient based on the first set of recipient information in Block S112; generating a notification message including a hyperlink to a secure web portal including content of the first electronic communication in Block S130; and transmitting the notification message to the first recipient address through an unencrypted transmission pathway in Block S116.

2. APPLICATIONS

Generally, the method S100 can be executed by a computer system (e.g., a local or remote server, a remote computer system)—in cooperation with a secure web portal (hereinafter a "sender portal") and/or an electronic communication service (e.g., an instant messaging service, a text messaging platform, and email client)—to identify access to secure electronic communication pathways, such as end-to-end encryption (or "E2EE"), between a sender (e.g., a doctor, a nurse practitioner, a member of a hospital group, a clinical administrator) and a device associated with a particular recipient address (e.g., a phone number or email address of a patient). Upon receipt of a message from the sender, designating a particular recipient address of a particular recipient, and containing sensitive information (e.g., medical records, clinical updates), the computer system can automatically verify that the particular recipient address supports secure electronic communications. Upon confirmation of such support, the computer system releases the message to the recipient address.

However, if the recipient address does not support secure electronic communications, the computer system can: initialize a secure communication thread specific to the recipient; inject content of the message into this secure communication thread; and transmit a hyperlink to an instance of the sender portal-specific to the recipient—to the recipient address in place of the original message. When the recipient then selects this hyperlink at her device (e.g., a smartphone, a tablet), the computer system (or a content distribution network in cooperation with the computer system) can serve the instance of the sender portal to a secure tab within the web browser executing on the recipient's device; and load the secure communication thread into this instance of the sender portal, thereby enabling the recipient to both securely review content of this message and easily access content of this message, such as without creating a username, password, or other user profile, etc.

2.1 Recipient Address Security Derivation

More specifically, the computer system can execute Blocks of the method S100 to access a message request from a sender—associated with or hosting the web portal—such as a message intended for a specific patient and designating a particular recipient address stored for the patient (e.g., in a patient profile containing phone number, email address, and/or other contact information or "recipient addresses" associated with the patient). The computer system can further actively identify or otherwise associate this recipient address—designated by the message—as either secure or insecure based on whether transmission of an electronic communication to the recipient address occurs via end-to-end encryption (or "E2EE") and an encryption strength of such encryption, if supported.

In one example in which the message includes an SMS text message designating a phone number associated with the recipient (e.g., a clinical patient), the computer system can: transmit a test text message or an introductory text message (e.g., "Hello. This is Acme Medical Clinic. We have a clinical update for you.") to the phone number. If the computer system receives an acknowledgement and confirmation of end-to-end encryption from the phone number, the computer system can: identify this phone number as supporting end-to-end encryption; flag this phone number as secure, such as in a recipient whitelist; and subsequently transmit messages—from the sender, designating this phone number, and containing sensitive information (e.g., medical records)—directly to this phone number. In this example, the computer system can also: re-confirm end-to-end encryption support at this phone number in response to receipt of acknowledgement and confirmation of end-to-end encryption from the phone number following transmission of each message directly to this phone number; and remove the phone number from the whitelist in response to failure to receive acknowledgement and confirmation of end-to-end encryption responsive to a later message sent by the computer system, such as if the recipient migrates this phone to a different phone supporting different (i.e., unencrypted) SMS electronic communications.

In another example in which the message includes an email designating an email address associated with the recipient, the computer system can implement methods and techniques described in U.S. patent application Ser. No. 18/389,175 to verify support of encrypted email by an email client associated with the email address. If the computer system thus confirms that the recipient's email client supports end-to-end encryption of a sufficient encryption strength, the computer system can: identify this email address as supporting sufficient communication security; flag this email address as secure, such as in a recipient whitelist; and subsequently transmit messages—from the sender, designating this email address, and containing sensitive information—directly to this email address.

However, if the recipient's phone number or email address does not support such security, the computer system can: flag these recipient addresses as insecure, such as in an address blacklist; and route contents of any message designating such an insecure recipient address either to a different, (more) secure address associated with the same recipient or to the secure communication thread associated with the recipient and accessible by the recipient via a hyperlink to an instance of the web portal specific to the recipient.

2.2 Replacement of Message with Hyperlink

Therefore, in response to identifying absence of end-to-end encryption at a recipient address, in response to an encryption strength supported at the recipient address falling below a minimum encryption strength, and/or in response to invalidation of a minimum encryption protocol supported by the recipient address, the computer system can: generate a unique secure communication thread, accessible within an instance of a sender portal associated with or hosted by the sender; and transmit a hyperlink for the instance of the sender portal to the recipient address (i.e., an insecure communication pathway), such as via Short Messaging Service (SMS) or Multimedia Messaging Service (MMS) over a cellular network.

Therefore, in response to identifying absence of sufficient security support by a transmission pathway corresponding to a recipient address designated for a message sent by the sender, the computer system can: transfer content from the message to a secure communication thread served to the recipient via a secure web portal accessed via a web browser executing on the recipient's device; and replace the message with a hyperlink to this secure web portal sent to the recipient via the insecure recipient address, thereby enabling the recipient to access and view content of the message immediately and securely by selecting this hyperlink and without additional steps, such as creating a username and password or entering login information.

2.3 Secure Aggregate Message History

In one example, the computer system can execute methods and techniques for all messages sent to the recipient to compile all message content for the recipient into the secure communication thread, specific to recipient.

More specifically, the computer system can load the secure communication thread—with complete message content history—into the sender portal when the user selects hyperlink, thereby enabling the user to view complete message content history, such as without requiring messages to be stored on the recipient's device.

In particular, the computer system can load the secure communication thread by populating the secure communication thread with both text message and email content—sent between the sender and the recipient and sorted by timestamp—into the secure communication thread. For example, in response to identifying absence of end-to-end encryption at a recipient phone number, the computer system can: transmit a hyperlink to the secure communication thread in a text message in place of sensitive information; and populate the secure communication thread with a text message history. Additionally, in response to identifying presence of end-to-end encryption at a recipient email address, the computer system can: pass an email directly to the recipient via the recipient email address; populate the secure communication thread with content from an email communication history, sorted by timestamp; and populate the sender portal with the hyperlink to enable the recipient to select the hyperlink at any time that the recipient accesses the sender portal and thus be routed to the secure communication thread where she may view contents of the email and all previous text and email communications between the sender and the recipient.

2.4 Alternative Recipient Address

In one variation, the computer system can: access a first electronic communication designating a first recipient address; and, in response to an encryption strength supported at the first recipient address falling below a minimum encryption strength, retrieve a second recipient address, such as from a recipient (e.g., a clinical patient) profile. Then, in response to an encryption strength supported at the second recipient address exceeding the minimum encryption strength, the computer system can: access a format for a second communication type (e.g., email) associated with the second recipient address; port content from the first electronic communication (e.g., an SMS text message) to a second electronic communication of the second communication type; and transmit the second electronic communication, in place of the first electronic communication, to the second recipient address.

Alternatively, in response to the encryption strength supported at the second recipient address falling below the minimum encryption strength, the computer system can revert to the sender portal to: populate the secure communication thread with content from the first electronic communication; and transmit the hyperlink to the secure communication thread to the recipient via the first recipient address.

Therefore, the computer system can automatically attempt to redirect the message from an insecure pathway to a (more) secure pathway for the recipient, such as if multiple recipient addresses are known or stored for the recipient.

2.5 Example: Sender Portal

Generally, the method S100 can be executed by a computer system (e.g., a local or remote server, a remote computer system)—interfacing with a sender portal (e.g., a web portal) and/or a messaging service (e.g., an instant messaging service)—to: receive a message request—including a message (e.g., a note, test results, an appointment reminder) and a set of recipient data (e.g., name, date of birth, contact information)—from a sender via the sender portal; verify whether a recipient device (e.g., a mobile phone) supports receipt of text messages via an encrypted transmission pathway—such as including transmission of end-to-end encrypted text message via an Internet connection—implemented by the messaging service; and, in response to transmission pathways supported by the recipient device including the encrypted transmission pathway, generate a text message—containing contents of the message provided by the sender—and authorize transmission of the text message to the recipient device according to the encrypted transmission pathway via the messaging service.

Alternatively, in response to transmission pathways supported by the recipient device excluding the encrypted transmission pathway, the computer system can: encrypt the message—provided by the sender—according to a target encryption level; store a copy of the encrypted message, such as locally or in a remote database; generate a hyperlink to a webapp that, when selected by the recipient (e.g., within a notification email), downloads and decrypts this copy of the encrypted message locally at the recipient's device; populate a notification message with the hyperlink and a prompt to select the hyperlink to download and/or view the message; and authorize transmission of the notification message to the recipient's device via an unencrypted transmission pathway (e.g., SMS, MMS), such as including transmission of unencrypted text messages via a cellular network.

The computer system can therefore ensure that messages sent from the sender exhibit at least a minimum level of encryption (e.g., end-to-end encryption) defined by the sender, while enabling senders to transmit messages to recipients via text message, thereby enabling (near) real-time communication—with minimum latency—between a sender and a recipient, while maintaining a relatively high level of security in transmission of messages from the sender to the recipient. Furthermore, the computer system can ensure that—when the recipient's device does not support receipt of text messages via the encrypted transmission pathway—the recipient is notified in (near) real-time via transmission of a notification message including a hyperlink to the (original) message, thereby enabling the recipient to access the message with a minimum latency while maintaining relatively high level of security.

2.6 Total Communication Security

Therefore, the computer system can automatically test and detect a maximum encryption level supported by a recipient address, such as in response to receiving a request from a sender (e.g., via a sender portal) to transmit a message containing secure (e.g., sensitive) information to the recipient address. Then, in response to the maximum encryption level supported by the recipient address falling below a threshold encryption level (e.g., a minimum encryption level), the computer system can access a second recipient address to automatically test and detect a maximum encryption level supported by the second recipient address; and/or, in response to absence of a second recipient address, automatically transmitting the message via the secure communication thread and transmitting a hyperlink to the secure communication thread to the first recipient address.

Thus, instead of transmitting the message via an insecure communication method (e.g., via a maximum encryption level supported by the recipient address) the computer system can automatically transmit content from the messages via the secure communication thread and/or via a second communication method associated with a second recipient address supporting an encryption level that exceeds the threshold encryption level.

2.7 Sender to Recipient(S)

The method S100 is described herein for transmitting communications between a sender and one target recipient. However, the computer system can execute Blocks of the method S100 to transmit a message (or a set of messages) to a set of recipients associated with the sender (e.g., a group of patients) via the sender portal by populating a set of secure communication threads, each secure communication thread associated with a recipient in the set of recipients, with contents of the message. Therefore, the method S100 can further enable mass communications between the sender and multiple recipients associated with insufficient secure electronic communication pathways by enabling communication between the sender and recipients in a secure communication thread executing in a secure web portal and accessible via a unique hyperlink.

3. MESSAGE REQUEST+ADMINISTRATOR PANEL

In one implementation, the computer system can receive a message request—including a message intended for a particular recipient and a set of recipient information (e.g., a name, a phone number, a date of birth) corresponding to the particular recipient. In particular, in this implementation, the computer system can receive the message request via a sender portal (e.g., a web portal) accessed by a user (hereinafter a "sender") affiliated with an organization. For example, the computer system can receive a message request from a message administrator—accessing the sender portal—affiliated with a hospital group. Additionally or alternatively, in this example, the computer system can also receive message requests from other users—such as including physicians, nurses, therapists, etc.—affiliated with the hospital group and permitted access to the sender portal (e.g., by the message administrator).

In response to receiving the message request, the computer system can populate a text message—formatted according to a set of message rules—with contents of the original message defined in the message request. Furthermore, the computer system can: leverage the set of recipient information contained in the message request to access a recipient profile, in a population of recipient profiles, corresponding to the particular recipient; and extract a device address (e.g., a phone number)—corresponding to a mobile device affiliated with the recipient—from the recipient profile. The computer system can then selectively authorize transmission of the text message to the device address (e.g., via a particular messaging service) as described below.

4. SECURE TRANSMISSION PATHWAYS

Generally, the computer system can identify absence and/or presence of secure transmission pathways supported by a recipient address.

As shown in FIG. 2, in one implementation the computer system can identify the absence of secure communications pathways by: in response to identifying absence of a history of communication (e.g., between the sender and the recipient address), transmitting an onboarding electronic communication (e.g., an onboarding text message) to the recipient address in Block S140; and, in response to absence of receiving a delivery receipt within a timeout duration following transmission of the onboarding electronic communication, associating the recipient address with insufficient messaging security in Block S142.

For example, the computer system can identify the absence of secure communications pathways by: transmitting an onboarding communication, such as an onboarding text message, including a hyperlink to a secure communication thread and identifying the sender; identifying a time period as a timeout duration; and, in response to absence of receiving a delivery receipt, such as a read-receipt, from the recipient, associating the recipient address, associated with the recipient, with insecure electronic communication pathways.

In a similar example, in response to identifying absence of initialization of a secure web portal, associating with the hyperlink in the onboarding text message, associating the recipient address, associated with the recipient, with insecure electronic communication pathways. Additionally or alternatively the computer system can, in response to absence of receiving a read receipt (indicating the recipient opened the onboarding text message), associate the recipient address, associated with the recipient, with insecure electronic communication pathways.

Additionally or alternatively, the computer system can identify the presence of secure communications pathways for the recipient by implementing similar methods and techniques described herein, such as in response to receiving a delivery receipt, such as a read-receipt, from the recipient, associating the recipient address, associated with the recipient, with secure electronic communication pathways.

In a similar implementation, the computer system can invalidate the presence of secure communications pathways for the recipient by: accessing encryption protocols supported by a mail client at the recipient address (e.g., an email address); and, in response to encryption protocols supported by the mail client excluding a first encryption protocol, associated with encryption of the first electronic communication, associating the recipient email address with insufficient messaging security.

For example, the computer system can receive the first electronic communication including a first email encrypted according to a first encryption protocol, sent by the sender, and designating the recipient email address; access a set of encryption protocols supported by a mail client associated with the recipient address; and, in response to encryption protocols supported by the mail client excluding the first encryption protocol, associating the recipient email address with insufficient messaging security.

Additionally or alternatively, the computer system can, in response to verification that a particular encrypted transmission pathway (e.g., a target encrypted transmission pathway) is supported by a recipient address: authorize transmission of messages from the sender to a recipient via the target encrypted transmission pathway (e.g., end-to-end encryption); and leverage an internet connection at both the sender and recipient devices to transmit messages according to the target encrypted transmission pathway.

More specifically, as shown in FIG. 1B, the computer system can: receive a second electronic communication sent by the sender and designating a second recipient address associated with a second recipient; and, in response to association of the second recipient address with sufficient secure communications, transmit the second electronic communication to the second recipient address, such as via the target encrypted transmission pathway.

Therefore, the computer system can identify presence (or absence) of secure electronic communication pathways between the sender and the recipient address: to enable transmission of messages for a recipient address associated with sufficiently encrypted transmission pathways; and to generate and transmit a hyperlink to a secure communication thread in a secure web portal for a second recipient address associated with insufficient, and/or unencrypted, transmission pathways.

4.1 Cellular Network

Generally, the computer system can authorize transmission of messages from the sender to a recipient via an encrypted transmission pathway that implements a target encryption protocol (e.g., end-to-end encryption) and leverages an internet connection at both the sender and recipient devices to transmit messages encrypted according to the target encryption protocol.

However, if the recipient device does not support receipt of messages via the encrypted transmission pathway, the computer system can generate a notification message for the recipient—in replacement of the original, unencrypted message—indicating receipt of a new message from the sender and including a link (e.g., a hyperlink) to a secure webpage or webapp containing an encrypted copy of the message. The computer system can then authorize transmission of the notification message to the recipient via an unencrypted transmission pathway (e.g., via SMS or MMS) that transmits unencrypted messages between the sender and recipient devices via a cellular network.

For example, the computer system can authorize transmission of messages via an encrypted transmission pathway—supported by mobile devices associated with a particular messaging service (e.g., an instant messaging service)—that implements end-to-end encryption to securely transmit text messages between senders and recipients via the Internet. In this example, the computer system can also withhold authorization of transmission of messages to recipient devices unaffiliated with the particular messaging service and that, therefore, do not support the encrypted transmission pathway. Instead, the computer system can transmit notification messages-linked to original messages from the sender—to these recipient devices via an unencrypted transmission pathway that transmits unencrypted text messages via a cellular network.

5. RECIPIENT DEVICE VERIFICATION

In one implementation, in response to receiving a message request from the sender (e.g., via the sender portal) to transmit a message to a particular recipient, the computer system can verify whether the recipient's device supports receipt of encrypted messages via the encrypted transmission pathway.

In particular, in this implementation, the computer system can: receive a message request—including a message (e.g., a text message, an instant message) and designating a device address (e.g., a phone number) corresponding to a mobile device affiliated with a target recipient of the message—sent by a sender associated with an organization; query a device database—associated with a messaging service and containing a population of device profiles associated with a population of mobile devices—for the device address; and, in response to a first device profile, in the population of device profiles, containing the device address, release the message for transmittal to the user via an encrypted transmission pathway—defining a target level of encryption (e.g., end-to-end encryption)—supported by the messaging service.

Alternatively, in response to each device profile, in the population of device profiles, omitting the device address, the computer system can: encrypt the message according to the target level of encryption; store a copy of the encrypted message, such as locally or in a remote database; generate a hyperlink to a webapp (or webpage) configured to download and decrypt the copy of the encrypted message; populate a notification message with the hyperlink and a prompt to select the hyperlink to download and/or view the message; and authorize transmission of the notification message to the recipient's mobile device. Then, in response to selection of the hyperlink in the notification email by the recipient, the webapp can then download and decrypt the copy of the encrypted message locally at the recipient's mobile device.

Additionally or alternatively, in another implementation, the computer system can automatically attempt transmission of a message to the target recipient via the encrypted transmission pathway. Then, in response to failure to transmit the message via the encrypted transmission pathway—such that the recipient's device does not support receipt of text messages via the encrypted transmission pathway—the computer system can instead authorize transmission of a notification message to the recipient's device via the unencrypted transmission pathway.

In particular, in this implementation, the computer system can: intercept a message (e.g., a text message, an instant message) sent by a sender associated with an organization and designating a device address (e.g., a phone number) corresponding to a mobile device affiliated with a target recipient of the message; generate a request—including the message—to transmit the message to the target recipient at the device address via a transmission pathway (e.g., via the internet) that implements at least a minimum level of encryption (e.g., end-to-end encryption); and transmit the request to a messaging service configured to transmit messages—according to the encrypted transmission pathway—to recipients affiliated with the messaging service. The messaging service may then verify whether the transmission pathway implemented by the messaging service is supported by the mobile device at the device address. Then, in response to confirming that the mobile device at the device address supports the transmission pathway, the messaging service can automatically transmit the message—according to the transmission pathway—to the target recipient.

Alternatively, if the recipient's mobile device does not support the transmission pathway, the messaging service can reject the request. For example, the messaging service can: query the device database—associated with the messaging service—for the device address. Then, in response to rejection of the request, the computer system can: encrypt the message according to the target level of encryption; generate a hyperlink to a webapp (or webpage) configured to download and decrypt the copy of the encrypted message responsive to selection of the hyperlink; populate a notification message with the hyperlink and a prompt to select the hyperlink to download and/or view the message; and authorize transmission of the (unencrypted) notification message to the recipient's mobile device via an secondary transmission pathway (e.g., via a cellular network) omitting any level of encryption.

In this implementation, the computer system can therefore minimize latency in transmission of messages to recipients by automatically triggering the messaging service to attempt transmission of these messages to recipient devices via the encrypted transmission pathway, such as without initially verifying whether a recipient device supports receipt of messages via the encrypted transmission pathway. If transmission of a message via the encrypted transmission pathway fails, the computer system can then generate a notification message—including a link to the original message—for transmittal to the recipient via the unencrypted transmission pathway.

5.1 Message Encrypted Transmission Pathway Temporarily UNAVAILABLE

In one variation, the computer system can generate a notification message for transmittal to a recipient's mobile device (e.g., in replacement of an original message)—affiliated with the messaging service—in response to failure of transmission of the message via the encrypted transmission pathway.

In particular, the recipient's mobile device may transiently support receipt of messages via the messaging service and according to the encrypted transmission pathway, such as when the mobile device is connected to the Internet. However, if receipt of messages via the encrypted transmission pathway is temporarily disabled at the recipient's mobile device, the computer system can selectively authorize transmission of notification messages—in replacement of encrypted (original) messages—to the recipient's mobile device.

In one implementation, in response to receiving confirmation (e.g., from the messaging service) that receipt of messages via the encrypted transmission pathway is currently disabled at the recipient device—and that the recipient device is configured to transiently enable receipt of messages via the encrypted transmission pathway (e.g., via an Internet connection)—the computer system can store the message in a queue for transmittal to the recipient device when receipt of messages via the encrypted transmission pathway is re-enabled at the recipient device.

For example, the computer system can: receive a message request—including a message intended for a recipient and a set of recipient information corresponding to the recipient—from a sender (e.g., via the sender portal); extract a phone number—corresponding to the recipient's mobile phone—from a user profile affiliated with the recipient based on the set of recipient information; populate a text message with contents of the message; generate a request to transmit the text message to the phone number via an encrypted transmission pathway; and transmit the request to a messaging service. The messaging service may then: query a device database—containing a list of phone numbers of mobile devices configured to receive text messages via the messaging service—for the phone number; and, in response to locating the phone number in the device database, release the text message for transmission to the recipient's mobile device via the encrypted transmission pathway. However, in response to absence of an Internet connection at the recipient's device—and therefore failure in transmittal of the text message via the encrypted transmission pathway—the computer system can: receive confirmation of a failed send; and, in response to receiving confirmation of the failed send, store the text message in a queue for transmittal at a later time. Then, at a fixed frequency (e.g., once-per-minute, every ten minutes, once-per-hour), the computer system can: generate a new request to transmit the text message to the phone number via the encrypted transmission pathway; and transmit the new request to the messaging service. The computer system can therefore re-attempt transmission of the text message at the fixed frequency until the Internet connection at the recipient's mobile device—required for transmittal of text messages via the encrypted transmission pathway—is restored.

Additionally or alternatively, in another implementation, the computer system can initiate a timer for transmittal of the encrypted message to the recipient device via the encrypted transmission pathway and automatically generate and authorize transmission of a notification message—via the unencrypted transmission pathway—to the recipient device in response to expiration of the timer.

5.2 Variation: Multiple Messaging Services

In one variation, the computer system can verify whether the recipient's device supports receipt of encrypted messages via multiple encrypted transmission pathways, such as supported by a different messaging services.

For example, the computer system can: receive a message request (e.g., via the sender portal) including a message and designating a device address (e.g., a phone number) corresponding to a mobile device affiliated with a target recipient of the message; and query a first device database—associated with a first messaging service and containing a first population of device profiles associated with a first population of mobile devices—for the device address. Then, in response to each device profile, in the first population of device profiles, omitting the device address, the computer system can: query a second device database—associated with a second messaging service and containing a second population of device profiles associated with a second population of mobile devices—for the device address; and, in response to a device profile, in the second population of device profiles, containing the device address, release the message for transmittal to the user via an encrypted transmission pathway supported by the second messaging service.

Alternatively, in the preceding example, in response to each device profile, in the second population of device profiles, omitting the device address, the computer system can encrypt the message according to a target level of encryption; store a copy of the encrypted message, such as locally or in a remote database; generate a hyperlink to a webapp configured to download and decrypt the copy of the encrypted message responsive to selection; populate a notification message with the hyperlink and a prompt to select the hyperlink to download and/or view the message; and authorize transmission of the notification message to the recipient's mobile device via the unencrypted transmission pathway.

The computer system can therefore verify whether the recipient's device supports receipt of encrypted messages transmitted via a set of encrypted transmission protocols by a set messaging services. Therefore, the computer system can be configured to interface with the set of messaging services to transmit encrypted messages to recipients.

6. REMOTE CONTENT ACCESS

Generally, the computer system can: generate a secure web portal (e.g., a sender portal) associated with the sender or a group affiliated with the sender and unique to the recipient; populate the secure web portal with a secure communication thread representing communications between the recipient and the sender; associate access to the secure web portal (and the secure communication thread) with a hyperlink unique to the recipient and the secure communication thread; and transmit the hyperlink to the recipient address via insecure (e.g., unencrypted) transmission pathways.

In response to transmission pathways supported by the recipient's device excluding the encrypted transmission pathway, the computer system can generate a notification message including a hyperlink to a secure webpage (or webapp) containing content of the message. The computer system can then authorize transmission of the notification message via an unencrypted transmission protocol (e.g., SMS, MMS).

For example, the computer system can: receive a message request including a message and designating a device address corresponding to a mobile device affiliated with a target recipient of the message; and query a device database—associated with a messaging service—for the device address. In response to the database omitting the device address—and therefore transmission pathways supported by the recipient's device excluding the encrypted transmission pathway implemented by the messaging service—the computer system can: encrypt the message according to a target encryption level; store a copy of the encrypted message, such as locally or in a remote database; generate a hyperlink to a webapp that, when selected by the recipient (e.g., within a notification email), downloads and decrypts this copy of the encrypted message locally at the recipient's mobile device; populate a notification message with the hyperlink and a prompt to select the hyperlink to download and/or view the message; and authorize transmission of the notification message to the recipient's mobile device via an unencrypted transmission pathway (e.g., SMS, MMS).

6.1 Hyperlink Access

Generally, in response to associating access to the secure web portal with the hyperlink, the computer system can: populate a notification (e.g., a text message, an email) with the hyperlink; and transmit the notification to the recipient via the recipient address in place of the first electronic communication. The system can then, in response to selection (by the recipient) of the hyperlink from the notification: initialize the secure web portal, such as on a web browser executing on a recipient device; populate the secure web portal with the secure communication thread; and render the secure web portal, with the secure communication thread, for the recipient.

In one implementation, the computer system can: in response to receiving a second electronic communication from the recipient address—excluded from the secure communication thread—generate a third electronic communication to the recipient address including the hyperlink to the secure communication thread; transmit the third electronic communication to the recipient via the recipient address; and, in response to the recipient selecting the hyperlink, populate the web portal with the secure communication thread including the second electronic communication.

6.1.1 Contact Card

Generally, the computer system can: generate a unique contact card, containing contact information for the sender and a hyperlink for access to the secure communication thread, for a first recipient based on a set of recipient information; and transmit the unique contact card to the first recipient.

Figure 3A:
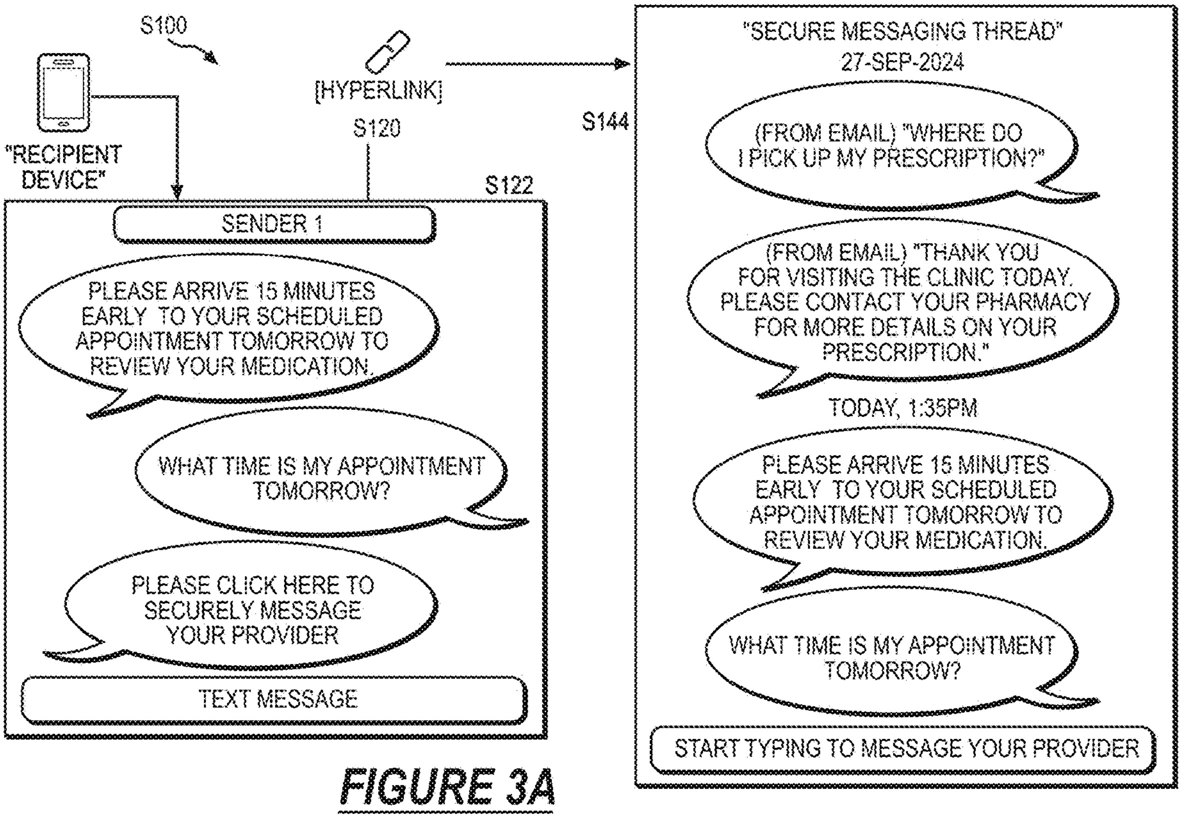
FIGS. 3A and 3B are schematic representations of the method.
Figure 3B:
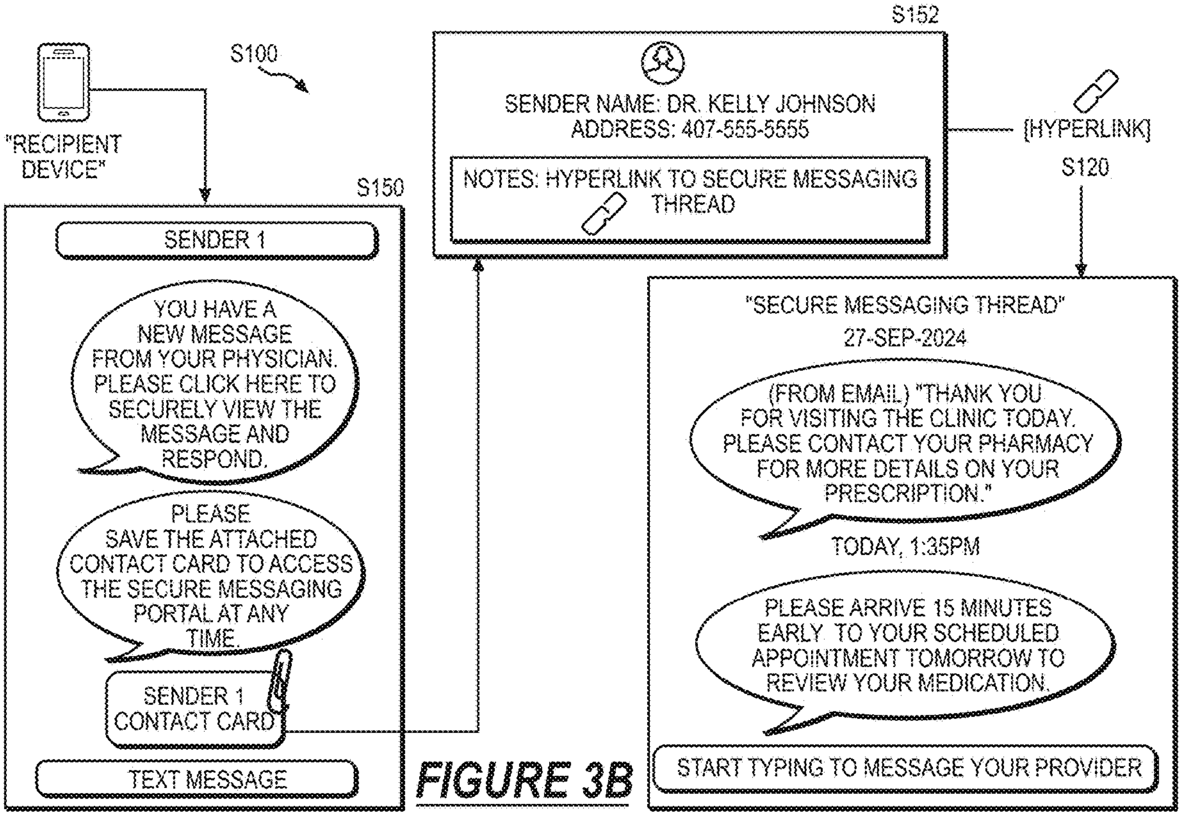

More specifically, as shown in FIGS. 3A AND 3B, the computer system can: populate a contact card with the hyperlink and a sender address associated with the sender in Block S152; and transmit the contact card to the recipient address in Block S150. For example, the computer system can: populate a contact card with a unique hyperlink associated with a unique web portal—specific to a secure communication thread associated with the recipient—such as by populating a notes section with the unique hyperlink; populate the contact card with the first sender address and an identifier for the first sender (e.g., a hospital group name); and transmit the contact card to the recipient.

Therefore, the computer system can enable a recipient to access the secure communication thread via the hyperlink following the transmission time of the first electronic communication, such as in response to the recipient closing the web browser on which the secure communication thread was executing, to access messages from the sender, and/or transmit additional messages to the sender.

Figure 4A:
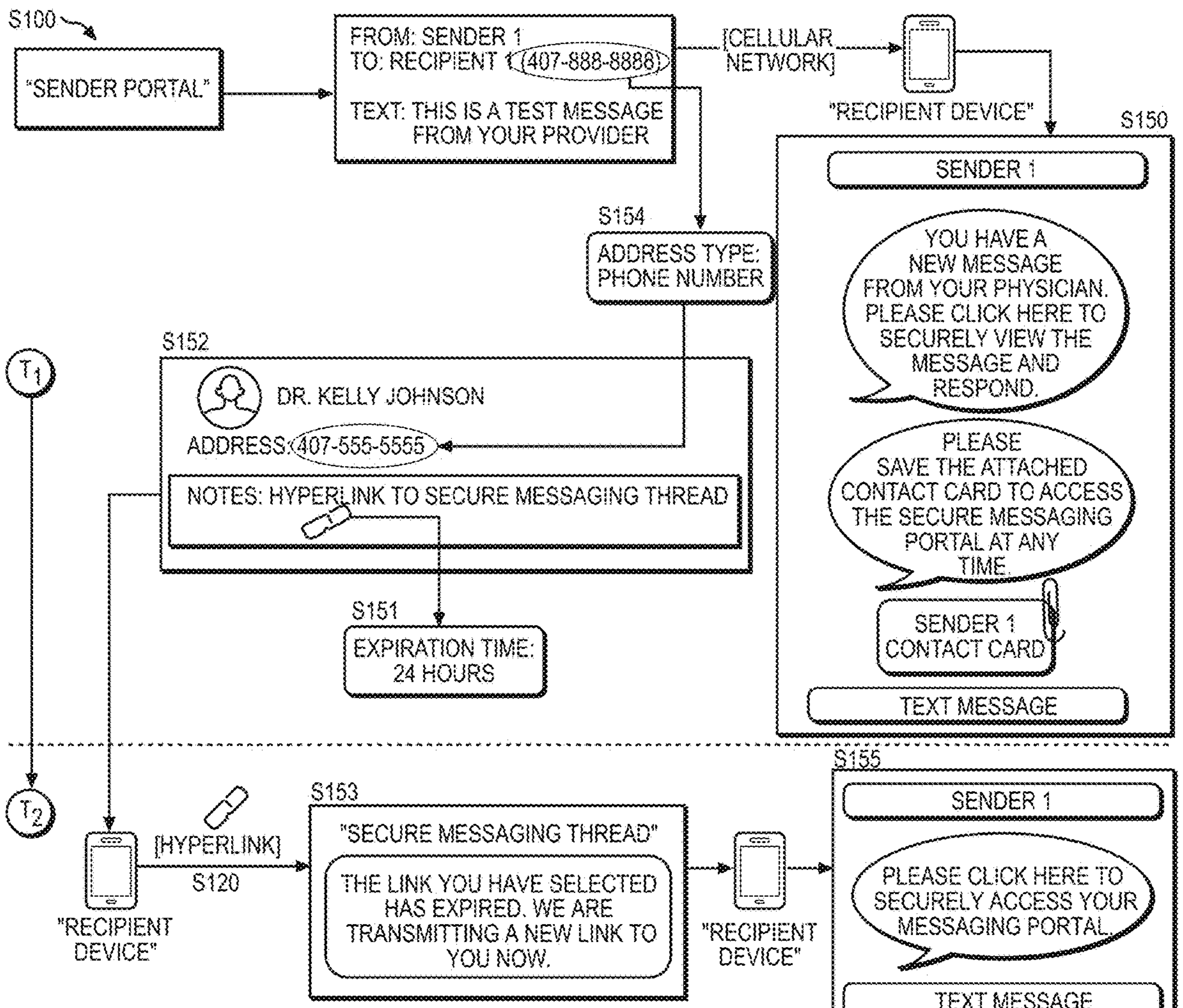
FIGS. 4A and 4B are schematic representations of the method.

As shown in FIGS. 3A and 4A, in one implementation the computer system can: identify a first address type (e.g., a phone number) associated with the first recipient address in Block S154; access a first sender address of the first address type (e.g., a sender phone number); populate a contact card with the first sender address in Block S152; and transmit the contact card to the recipient via the first recipient address in Block S150.

Figure 4B:
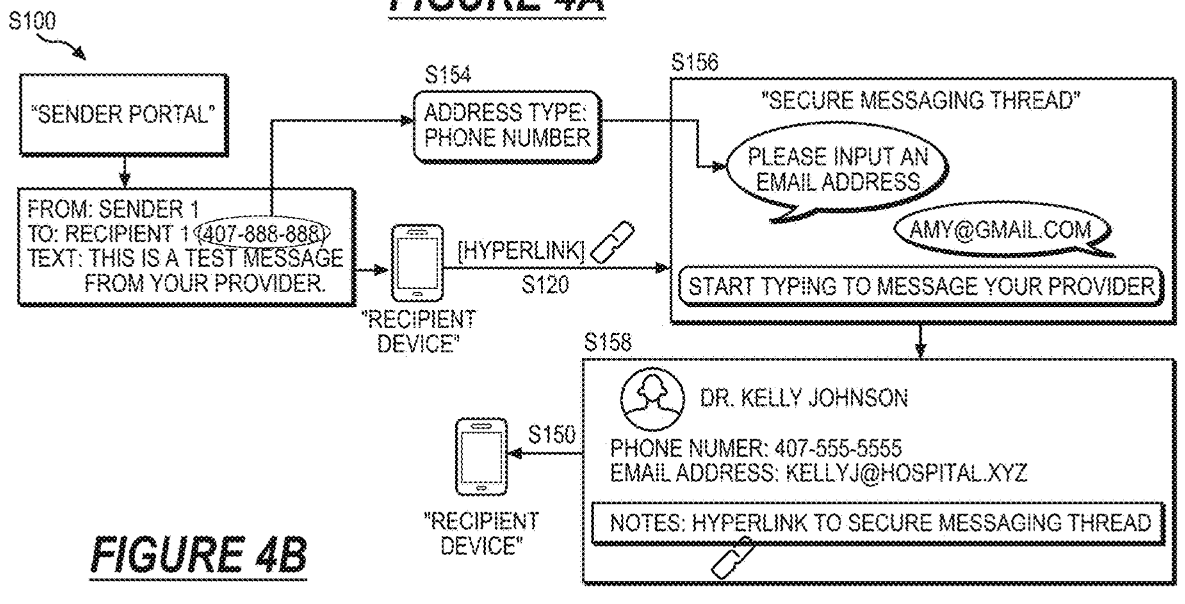

For example, as shown in FIG. 4B, the computer system can: identify a first address type of the recipient address in Block S154; populate the contact card with the sender address of the first address type; generate a prompt to the recipient including a request for a second recipient address of a second address type in Block S156; populate the secure communication thread with the prompt; in response to receiving the second recipient address of the second address type from the recipient in the secure communication thread, annotate the contact card with a second sender address of the second address type in Block S158; and transmit the contact card (updated with the second sender address) to the recipient address in Block S150.

In one variation, the computer system can: access a recipient profile associated with the recipient; identify a set of recipient addresses in the recipient profile; identify an address type for each address in the set of recipient addresses; access a sender address for each address type identified in the set of recipient addresses; populate a contact card with the sender addresses; and transmit the contact card to the recipient including the sender addresses and the hyperlink.

In a similar variation, the computer system can, in response to identifying a set of recipient address, in the recipient profile, containing one recipient address of a first address type and in response to initializing the secure web portal to a web browser: generate a prompt requesting a second recipient address of a second address type (e.g., different from the first address type); and transmit the prompt to the recipient by populating the secure communication thread with the prompt. The computer system can further, in response to receiving the second recipient address: identify the second address type (e.g., an email); populate a recipient profile, associated with the recipient, with the second recipient address; access a second sender address of the second address type (e.g., a sender email address); populate the contact card with the second sender address; and transmit the contact card, including the first sender address and the second sender address, to the first recipient address.

Therefore, the computer system can aggregate communications across multiple channels (e.g., text message and email) into a single secure channel accessible from any device on which the recipient can receive text messages and/or emails. Furthermore, the computer system can control the source of recipient communications based on given sender addresses and enforce transmission of communications from a known address (e.g., an address known to be associated with the recipient), to thereby prevent communications from unknown addresses.

6.2 Hyperlink Expiration

In one implementation, as shown in FIG. 4A, the computer system can generate a hyperlink defining an expiry time in Block S151. The computer system can then, at a second time succeeding the expiry time and in response to the recipient selecting the hyperlink: initialize the secure web portal for access via the web browser at the recipient device; populate the secure web portal with a prompt indicating selection of the hyperlink following the expiry time in Block S153; and transmit a second electronic communication including a second hyperlink to the recipient in Block S155. The computer system can then, in response to selection of the second hyperlink: initialize the secure web portal for access via the web browser at the recipient device; and populate the secure web portal with the secure communication thread.

In one variation, the computer system can: assign an expiry time (e.g., 24 hours) to the hyperlink; in response to selection of the hyperlink beyond the expiry time (e.g., after 48 hours), transmit a second electronic communication (e.g., a second text message) to the recipient address including a second hyperlink (differing from the first hyperlink) to the secure web portal associated with the secure communication thread associated with the recipient; and, in response to selection of the second hyperlink, render the secure web portal for the recipient and populate the secure web portal with the secure communication thread.

For example, wherein the hyperlink defines an expiry time (e.g., 24 hours), the computer system can: execute the secure web portal on a web browser; prompt the recipient to answer a security question (e.g., input a birth date associated with the recipient); and, in response to validation of the security question, populate the secure web portal with the secure communication thread.

Therefore, the computer system can enable a recipient to securely access sensitive communications-such as between a healthcare provider and a patient-even if secure communication pathways are unavailable for transmission of the sensitive communications from the sender to the recipient.

6.3 Secure Communication Thread+Message History

Generally, the computer system can: access a message history, such as the first electronic communication from the sender to the recipient; and populate a secure communication thread with the message history, organized according to timestamps, indicating time of transmission, for each message in the message history.

As shown in FIG. 3A, in one implementation the computer system can, at a second time succeeding transmitting an onboarding electronic communication (e.g., a first text message): receive a second electronic communication from the recipient and designating the sender, the second electronic communication including a second text message in Block S122; generate a third text message including the hyperlink; transmit the third text message to the recipient via the recipient address; and, in response to the recipient selecting the hyperlink, initialize the secure web portal for access via the web browser at the recipient device and populate the secure web portal with the secure communication thread including the first electronic communication, the second electronic communication, and the third electronic communication.

As shown in FIG. 3A, in a similar implementation during a second time period succeeding transmission of the contact card to the recipient address and in response to the recipient selecting the hyperlink from the contact card, the computer system can: initialize the secure web portal for access via the web browser at the recipient device; and populate the secure web portal with the first secure communication thread including a message history (e.g., a text message history, an email message history) between the recipient and the sender in Block S144.

In one variation, the computer system can populate the secure web portal with the secure communication thread by: accessing a text message history including a first set of text messages sent from the recipient address and designating the sender and a second set of text messages sent from the sender and designating the recipient address; accessing an email message history including a first set of emails sent from a second recipient address associated with the recipient and designating the sender and a second set of emails sent from the sender and designating the second recipient address; and populating the secure communication thread with the text message history and the email message history based on timestamps associated with each text in the text message history and each email in the email message history.

For example, the computer system can: access a first message history of a first message type (e.g., email); access a second message history of a second message type (e.g., text message); and populate the secure communication thread with contents of each message in the first message history and each message in the second message history, based on time of transmission (i.e., in chronological order) of each message.

In another example, for a first recipient associated with a first recipient address of a first address type (e.g., an email address), the computer system can: access a recipient profile, associated with a hospital group affiliated with the sender including the first recipient address and a second recipient address of a second address type (e.g., a phone number); access a first message history between the sender address and the first recipient address, such as via a mail client of the recipient (and/or the sender); access a second message history between the sender address and the second recipient address, such as via the secure communication thread; aggregate the first message history between the sender address and the first recipient address and the second message history between the sender address and the second recipient address by organizing the message histories based on transmission time; and populate the secure communication thread with the message histories organized based on transmission time.

Figure 6:
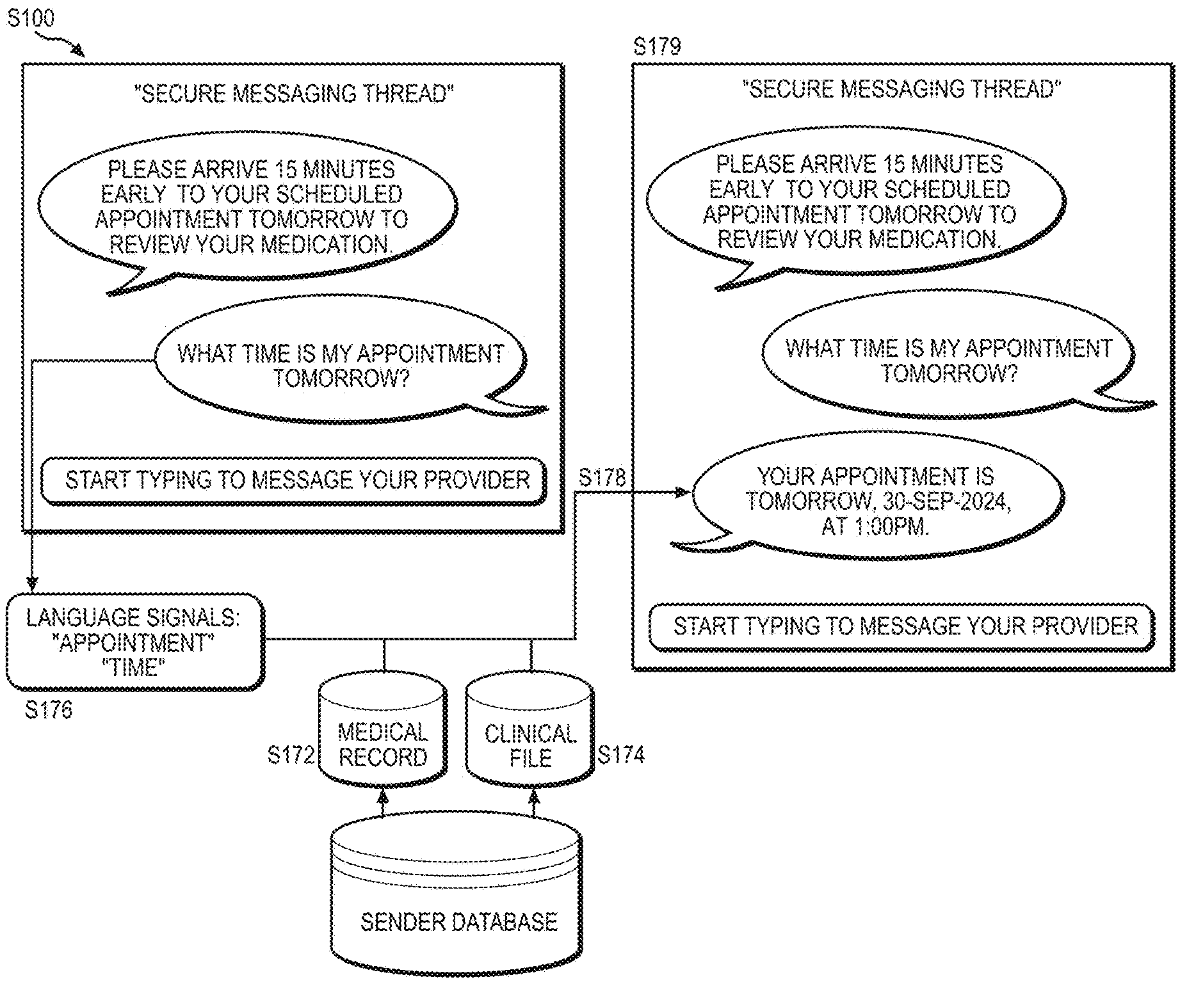
FIG. 6 is a schematic representation of the method.

As shown in FIG. 6, in one variation, the computer system can further, in response to the recipient selecting the hyperlink: retrieve a recipient medical record associated with the recipient in Block S172; retrieve a clinical directory associated with the sender in Block S174; receive a second electronic communication from the recipient in the secure communication thread; extract a set of language signals from the second electronic communication in Block S176; generate a response based on the set of language signals, the medical record, and the clinical directory in Block S178; and populate the secure communication thread with the response in Block S179.

For example, in response to receiving a second electronic communication from the recipient in the secure communication thread, such as a prompt intended for a provider associated with the sender group, the computer system can: retrieve a clinical directory, including a set of providers associated with the sender (e.g., a hospital directory); retrieve a medical file, including a medical record and a subset of providers associated with the recipient, from a database associated with the sender (e.g., from a recipient profile); extract a set of language signals (e.g., content from) from the second electronic communication; generate a response, such as a second prompt to schedule an appointment with the provider, based on the set of language signals, the medical record, and the clinical directory; and populate the secure communication thread with the response.

In this example, the computer system can: pass the second electronic communication into a large language model (or "LLM"), chatbot, or other conversational agent; pass the recipient's medical record(s) and/or contents of a clinical file to the conversational agent, such as directly or via retrieval-augmented generation (or "RAG") techniques; and inject a response from the conversational agent into the secure communication thread within the sender portal, thereby enabling the recipient to access immediate support, guidance, and/or answers when reviewing contents of a message recently sent to the recipient.

6.4 Recipient Opt-Out

In one variation, the computer system can enable the recipient of the message to opt out of receiving notification messages in replacement of messages (e.g., from a particular sender). In particular, in this variation, a user may elect to receive messages directly from the sender—rather than receive notification messages—regardless of availability of end-to-end encryption for messages transmitted to a mobile device associated with the user.

In one implementation, the computer system can insert an "opt-out" hyperlink—and a description indicating that the recipient may select an option to receive unencrypted or lower-encrypted messages from the sender in the future by signing an agreement linked to the opt-out hyperlink—into a notification message sent to the user. Additionally or alternatively, in another implementation, the computer system can insert the "opt-out" hyperlink and corresponding description into a secure webpage—containing contents of an original message sent to the user from the sender—linked to a hyperlink contained in the notification message sent to the user. In particular, the computer system can: populate a secure webpage with the message and an "opt-out" hyperlink; generate a hyperlink to the secure webpage; populate a notification message with the hyperlink and a prompt to select the hyperlink to access contents of the message; and release the notification message for transmittal to the user (e.g., by a messaging service affiliated with the user's mobile device).

In the foregoing implementations, in response to selection of the opt-out hyperlink, the computer system can trigger a web browser—executing on the recipient's mobile device—to navigate to an opt-out webpage containing: an electronic contract (i.e., an encrypted message waiver) for assuming liability by the recipient for data loss for inbound messages from the sender address (e.g., sender phone number, sender account identifier) to the device address (e.g., phone number)—associated with the recipient's device—in exchange for disabling encryption of inbound messages from the sender address to the recipient's device address; an electronic signature line for execution of the electronic contract; and an option to submit the electronic contract. In response to execution of the electronic contract by the recipient through the opt-out webpage, the computer system can automatically append the device address to the recipient exclusion database and load the electronic contract into a waiver database.

Alternatively, the computer system can return the electronic contract directly to an administrator of the sender address for manual processing. Yet alternatively, the computer system can: prompt the recipient to select from a prepopulated list of rationale or to manually enter a rationale for disabling end-to-end message encryption for messages received from the sender address; return the electronic contract to the administrator of the sender address for confirmation; and then automatically update the recipient exclusion list accordingly or serve this confirmed encrypted message waiver to the administrator of the sender address for final processing.

In the foregoing implementation, the computer system can also provide the recipient—through the opt-out webpage—options to either: disable end-to-end encrypted messages between the recipient and the sender address entirely; or authorize reduced end-to-end encryption requirements for messages exchanged between the recipient and the sender address. Later, the computer system can selectively authorize transmission of encrypted messages, unencrypted messages, and/or unencrypted notification messages from the sender address to the recipient's device address according to the selection thus submitted by the recipient.

The method is described herein as transmitting a hyperlink to a secure communication thread in response to identifying insufficient secure communication pathways associated with the recipient address. However, the computer system can implement methods and techniques described herein to transmit a unique hyperlink for secure communications to each recipient address in a set of recipient addresses regardless of presence of secure communication pathways.

7. MESSAGE FAILURE

Generally, in response to failure of delivery of the first electronic communication to the recipient, the computer system can populate a message queue for secure communication of contents of the first electronic communication to the recipient.

Figure 5A:
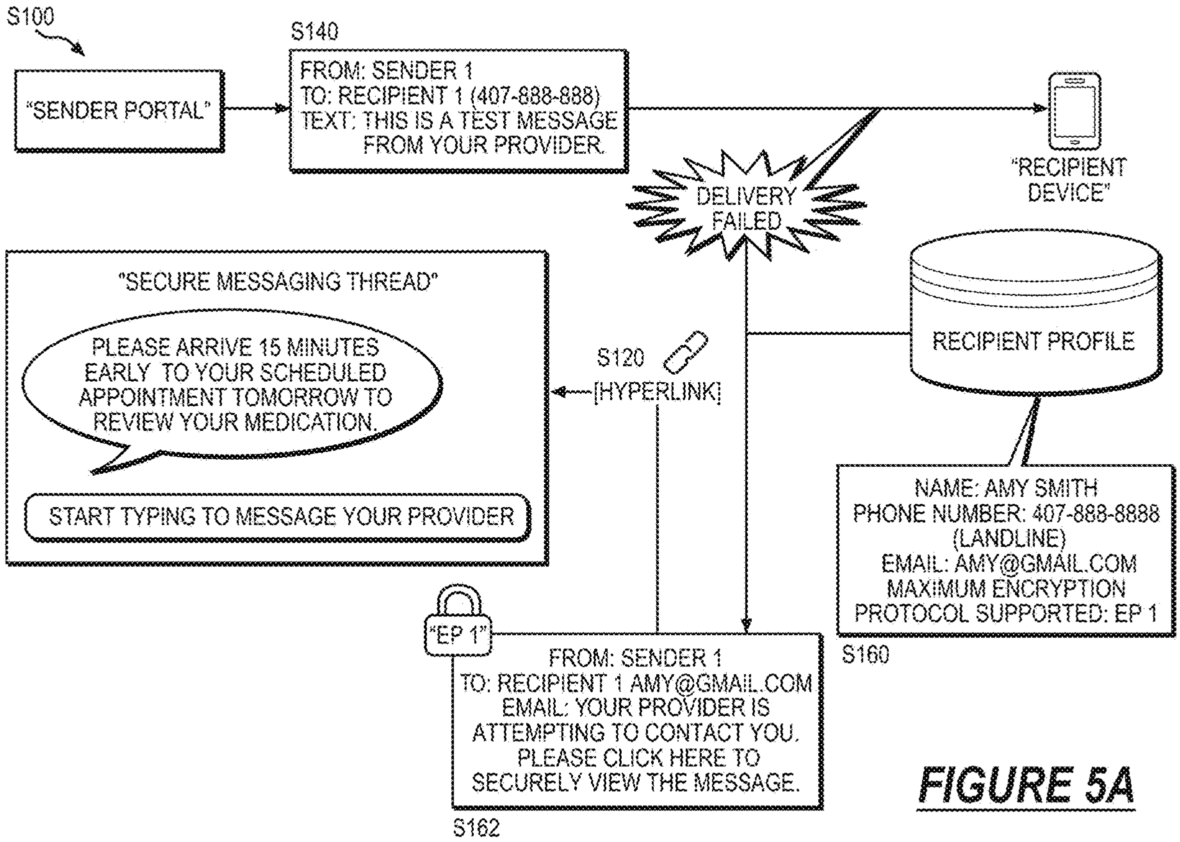
FIGS. 5A and 5B are schematic representations of the method.
Figure 5B:
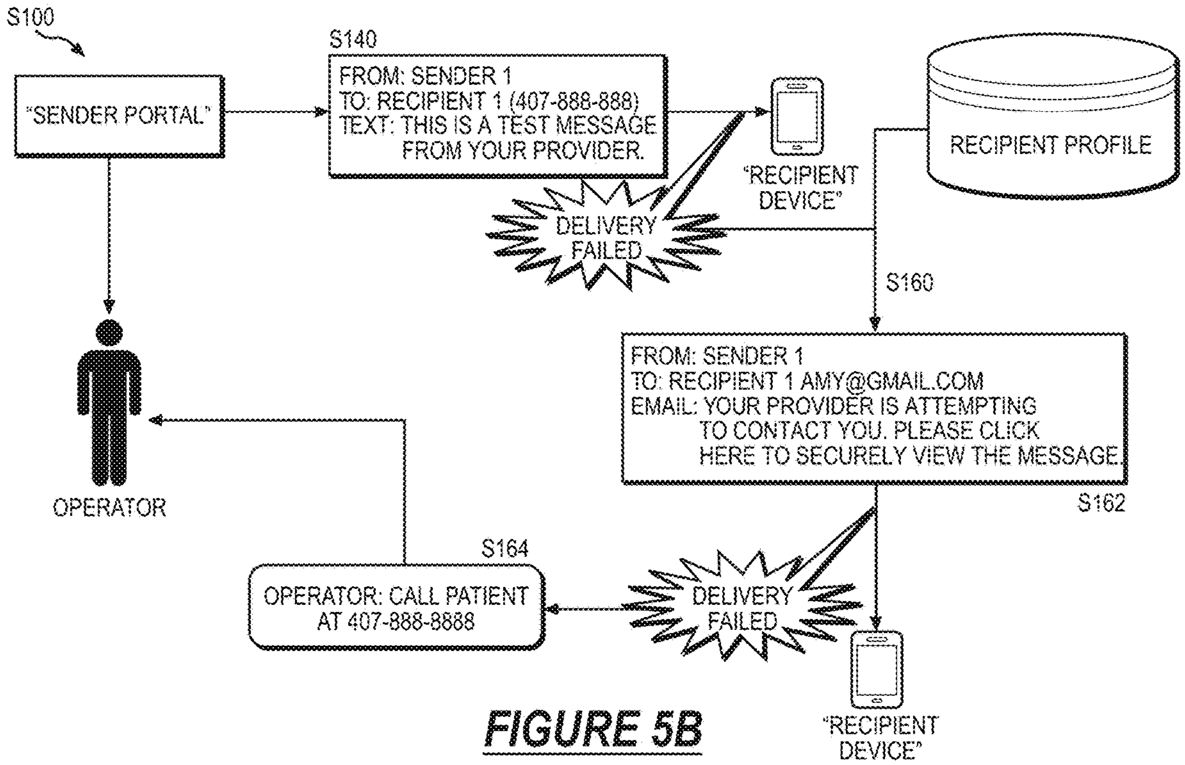

As shown in FIGS. 5A and 5B, in one variation of the method, receiving the first electronic communication sent by the sender and designating the recipient address includes receiving the first electronic communication including a text message. In this variation, the computer system can further: in response to identifying failure of delivery of the text message responsive to transmitting the text message to the recipient address, retrieve a second recipient address including a recipient email address in Block S160; populate an email with contents of the text message and the hyperlink in Block S162; and transmit the email to the recipient email address. This variation can further include: in response to identifying failure of delivery of the email responsive to transmitting the email to the recipient email address; accessing a phone number associated with the recipient; and generating a prompt to an operator, associated with the sender, to call the recipient via the phone number to transmit contents of the text message in Block S164.

For example, in response to identifying failure of delivery of the first electronic communication (e.g., a first text message), the computer system can: access a recipient profile associated with a hospital group affiliated with the sender including the first recipient address of a first address type (e.g., a phone number) and a second recipient address of a second address type (e.g., an email address); extract the second recipient address of the second address type from the recipient profile; generate an email designating the second recipient address; populate the email with the hyperlink; and transmit the email to the second recipient address.

For example, in response to identifying failure of transmission of the first electronic communication (e.g., a first text message), such as by identifying absence of a delivery receipt and/or identifying failure of transmission in a message status portal, the computer system can: associate the recipient address as unable to receive electronic communications (e.g., a landline phone); retrieve a second recipient address (e.g., an email address), such as from a recipient profile associated with the sender group; generate an email designating the second recipient address; populate the email with contents of the first electronic communication and the hyperlink; and transmit the email to the second recipient address. During a second time period preceding transmission of the email, in response to identifying absence of a response from the recipient (from the second recipient address), the computer system can then: generate a prompt to an operator, affiliated with the sender, including a request to contact the patient via a recipient address in the recipient profile, such as by calling the recipient via the first recipient address, and to transmit contents of the first electronic communication; and transmit the prompt to the operator.

Additionally or alternatively, in response to populating the email with the hyperlink, the computer system can: verify encryption protocols supported by a mail client associated with the second recipient address; encrypt the email according to a first encryption protocol supported by the mail client; and transmit the email, encrypted according to the first encryption protocol, to the recipient via the second recipient address.

8. UPDATING THE RECIPIENT PROFILE

In one implementation, the computer system can update a recipient profile—associated with a particular recipient and/or recipient's mobile device—based on whether the recipient device supports receiving encrypted messages via an encrypted transmission pathway. In particular, the computer system can leverage device data collected in response to transmission of a first message from the sender and to the recipient's device to update the recipient profile based on a transmission pathway (e.g., encrypted, unencrypted) implemented during transmission of the first message. The computer system can then access the recipient profile and automatically authorize transmission of subsequent messages to the recipient's device according to this transmission pathway.

For example, the computer system can: receive a first request to transmit a first message to a first recipient; access a first recipient profile, in a population of recipient profiles, associated with the first recipient; extract a first phone number of a first mobile device, affiliated with the first recipient, from the first recipient profile; and query a device database—associated with an encryption-enabled messaging service—for the first phone number. In response to receiving confirmation of the first phone number in the device database, the computer system can authorize transmission of the first message to the first mobile device via the encryption-enabled messaging service according to the encrypted transmission pathway. Then, in response to receiving confirmation of transmission of the first message according to the encrypted transmission pathway, the computer system can store a first value—indicating that the first mobile device of the first recipient supports receipt of messages via the encrypted transmission pathway—in the recipient profile. Later, in response to receiving a second request to transmit a second message to the first recipient, the computer system can: access the first recipient profile; and, in response to the first recipient profile containing the first value, automatically authorize transmission of the second message to the first recipient at the first mobile device via the encrypted transmission pathway.

Furthermore, in this example, the computer system can: receive a third request to transmit a third message to a second recipient; access a second recipient profile, in the population of recipient profiles, associated with the second recipient; extract a second phone number of a second mobile device, affiliated with the second recipient, from the second recipient profile; and query the device database—associated with the encryption-enabled messaging service—for the second phone number. In response to the device database omitting the second phone number, the computer system can: store the third message in a database; generate a notification email including a hyperlink to the third message in the database; authorize transmission of the notification email to the second recipient at the second mobile device via the unencrypted transmission pathway; and store a second value—indicating that the second mobile device of the first recipient does not support receipt of messages via the encrypted transmission pathway—in the recipient profile. Later, upon receiving a fourth request to transmit a fourth message to the second recipient, the computer system can: access the second recipient profile; and, in response to the second recipient profile containing the second value, automatically generate and authorize transmission of a notification message-including a hyperlink to the fourth message (e.g., stored in the database)—to the second recipient at the second mobile device, without querying the device database affiliated with the encryption-enabled messaging service.

9. VARIATION: RECIPIENT EXCLUSION LIST

In one variation, the computer system can verify whether a recipient exclusion list—generated for a particular organization—includes a target recipient of a message before querying the device database of the messaging service and/or attempting to transmit the message via the encrypted transmission pathway. In particular, in this variation, the computer system can interface with the message administrator to compile a list of recipients excluded from receiving encrypted messages and/or notification messages and store this list of recipients in a recipient exclusion list. The computer system can therefore automatically authorize transmission of unencrypted messages—via the unencrypted transmission pathway—to recipients included in the recipient exclusion list.

For example, the computer system can: receive a message request—including a message intended for a first recipient and a first set of recipient information corresponding to the first recipient—from a sender via the sender portal; and access a recipient exclusion list affiliated with the sender. Then, in response to the recipient exclusion list including the first recipient, the computer system can: extract a phone number—corresponding to the recipient's mobile phone—from a user profile affiliated with the recipient based on the set of recipient information; populate a text message with contents of the message; and automatically authorize transmission of the text message to the first recipient via an unencrypted transmission pathway (e.g., SMS, MMS). Alternatively, in response to the recipient exclusion list excluding the first recipient, the computer system can implement methods and techniques described above to selectively: authorize transmission of the first message via an encrypted transmission pathway; or generate and transmit a notification message—including a hyperlink to a webpage (or webapp) containing contents of the first message in response to transmission pathways supported by the recipient's mobile device excluding the encrypted transmission pathway.

10. SENSITIVE CONTENT DETECTION

In one variation, the computer system can implement data loss prevention techniques to scan the transcription for sensitive information (e.g., personal health information).

In particular, in this variation, the computer system can: receive a message sent by a sender associated with an organization and designating a device address corresponding to a mobile device affiliated with a target recipient of the message; scan the message for sensitive information, such as including personal health information, identifying information (e.g., a social security number, a driver's license number), and/or financial information (e.g., a credit card number and/or other payment information); and, based on presence of sensitive information in the message, selectively transmit the message and/or generate a notification message for transmittal to the user, as described above.

In one implementation, the computer system can automatically transmit a message to a target recipient of the message in response to absence of sensitive information in the message. For example, the computer system can: receive a message—corresponding to an appointment reminder—sent by a sender associated with an organization and designating a device address corresponding to a mobile device affiliated with a target recipient of the message; scan the message for presence of sensitive information; and, in response to absence of sensitive information in the message, release the message for transmittal to the target recipient according to a transmission protocol (e.g., via the internet, via cellular network) supported by the recipient's mobile device.

Alternatively, in response to detecting presence of sensitive information in the message, the computer system can verify whether the recipient's device supports the encrypted transmission pathway. In particular, the computer system can: access a device database—containing a population of device profiles associated with a population of mobile devices—associated with a messaging service employed by the sender and configured to transmit messages (e.g., instant messages) according to the encrypted transmission pathway; and, in response to a device profile, in the population of device profiles, containing the device address, release the message for transmittal to the user via the encrypted transmission pathway—defining a target level of encryption (e.g., end-to-end encryption)—supported by the messaging service. However, in response to each device profile, in the population of device profiles, omitting the device address, the computer system can generate a notification message—including a hyperlink to a webapp containing contents of the message—for transmittal to the recipient via a transmission pathway (e.g., SMS) supported by the recipient's mobile device.

In one implementation, the computer system can characterize risk associated with a message based on presence of sensitive content in the message. For example, for a particular message, the computer system can characterize a risk value (e.g., a numerical value, a qualitative value)—representative of risk associated with the particular message—based on: language signals—such as corresponding to financial information, security (e.g., passwords, login credentials), recipient health information, recipient identity)—extracted from the message; presence of attachments—such as including audio, video, and/or pdf attachments—within the message; etc. Based on the risk value, the computer system can then selectively: authorize transmission of the message via the encrypted transmission pathway; or automatically generate and transmit a notification message—including a hyperlink to a webpage (or webapp) containing contents of the message—to the recipient's device via an unencrypted transmission pathway.

11. VARIATION: MULTIPLE RECIPIENTS

In one variation, the computer system can implement methods and techniques described herein to send a second electronic communication (e.g., a generic message intended for multiple patients associated with a hospital group) to a set of recipient addresses associated with a set of recipients, such as by: populating each secure communication thread, in a set of secure communication threads associated with the set of recipients, with contents of the second electronic communication; generating a notification for each recipient in the set of recipients including the hyperlink associated with each secure communication thread in the set of secure communication threads and a prompt indicating a new message from the sender; and transmitting the notification to each recipient address in the set of recipient addresses.

Figure 7:
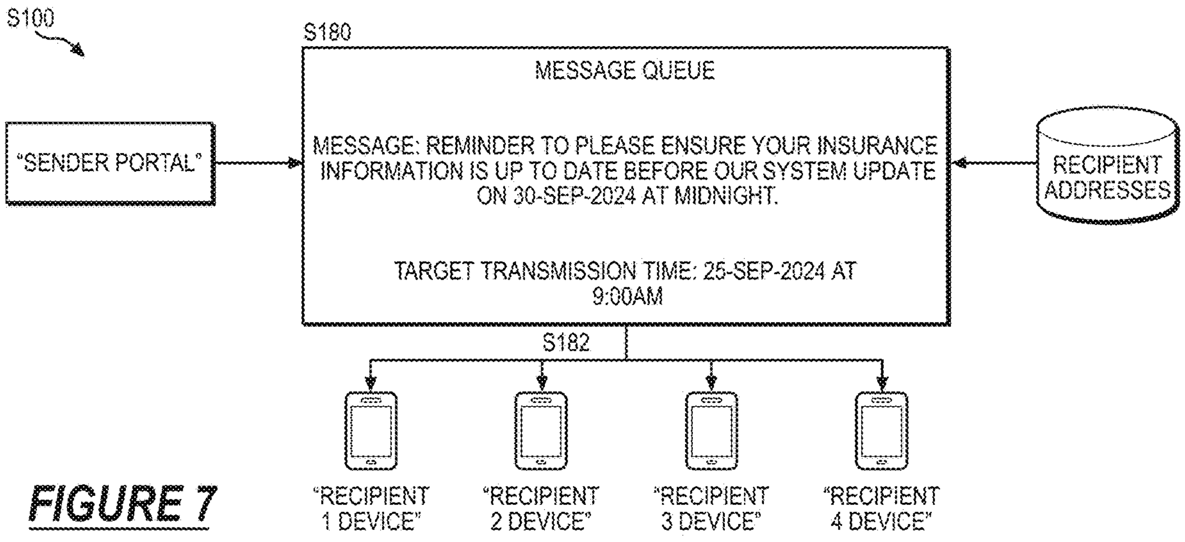
FIG. 7 is a schematic representation of the method.

For example, as shown in FIG. 7, the computer system can: receive the first electronic communication sent by the sender and designating the recipient address by receiving the first electronic communication including a first recipient-specific text message; access a messaging queue associated with the secure web portal including a set of recipient addresses associated with a set of recipients, a second generic text message, and a target transmission time for transmission of the second text message to each recipient address in the set of recipient addresses in Block S180; and, at the target transmission time, transmit the second text message to each recipient address in the set of recipient addresses in Block S182.

The computer system can therefore implement methods and techniques as described herein to simultaneously transmit similar content to multiple recipients.

12. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

receiving a first electronic communication:

sent by a sender; and designating a recipient address associated with a recipient; and comprising a first recipient-specific message;

in response to association of the recipient address with insufficient communication security:

initializing an instance of a secure web portal associated with the recipient;

initializing a secure communication thread accessible within the instance of the secure web portal;

populating the secure communication thread with contents of the first electronic communication;

associating the instance of the secure web portal and the secure communication thread with a hyperlink;

generating a notification comprising the hyperlink; and transmitting the notification to the recipient address in place of the first electronic communication; and in response to selection of the hyperlink at a recipient device:

serving the instance of the secure web portal to a web browser at the recipient device; and loading the secure communication thread into the instance of the secure web portal;

accessing a messaging queue associated with the secure web portal and comprising:

a set of recipient addresses associated with a set of recipients;

a second generic message;

a target transmission time for transmission of the second generic message to each recipient address in the set of recipient addresses; and at the target transmission time, for each recipient address in the set of recipient addresses:

in response to association of the recipient address with insufficient communication security:

initializing a second instance of a second secure web portal associated with the recipient;

initializing a second secure communication thread accessible within the second instance of the second secure web portal;

populating the second secure communication thread with contents of the first electronic communication;

associating the second instance of the second secure web portal and the second secure communication thread with a second hyperlink;

generating a second notification comprising the second hyperlink; and transmitting the second notification to the recipient address in place of the first electronic communication; and in response to association of the recipient address with sufficient communication security:

transmitting the first electronic communication to the recipient.

2. The method of claim 1, further comprising:

receiving a second electronic communication:

sent by the sender; and designating a second recipient address associated with a second recipient; and in response to association of the second recipient address with sufficient secure communications, transmitting the second electronic communication to the second recipient address.

3. The method of claim 1:

wherein receiving the first electronic communication comprises receiving the first electronic communication comprising a text message; and further comprising:

in response to absence of a history of communication between the sender and the recipient, transmitting an onboarding text message to the recipient address; and in response to absence of receiving a delivery receipt within a timeout duration following transmission of the onboarding text message, associating the recipient address with insufficient messaging security.

4. The method of claim 3, further comprising, following transmission of the onboarding text message:

receiving a second electronic communication from the recipient and designating the sender, the second electronic communication comprising a second text message;

generating a third text message comprising the hyperlink;

transmitting the third text message to the recipient via the recipient address; and in response to the recipient selecting the hyperlink:

initializing the instance of the secure web portal for access via the web browser at the recipient device; and populating the instance of the secure web portal with the secure communication thread comprising the first electronic communication, the second electronic communication, and the third electronic communication.

5. The method of claim 1, further comprising:

populating a contact card with the hyperlink and a sender address associated with the sender; and serving the instance of the secure web portal to the web browser at the recipient device in response to selection of the hyperlink from the contact card at the recipient device.

6. The method of claim 1, further comprising:
assigning an expiry time to the hyperlink;
at a second time succeeding the expiry time and in response to the recipient selecting the hyperlink:
initializing the instance of the secure web portal for access via the web browser at the recipient device;
populating the instance of the secure web portal with a prompt indicating selection of the hyperlink past the expiry time; and
transmitting a second electronic communication comprising a third hyperlink to the recipient; and
in response to selection of the third hyperlink at the recipient device;
initializing the instance of the secure web portal for access via the web browser at the recipient device; and
populating the instance of the secure web portal with the secure communication thread.

7. The method of claim 1:
further comprising identifying a first address type of the recipient address;
wherein populating the contact card with the hyperlink and the sender address comprises populating the contact card with the sender address of the first address type; and
further comprising:
generating a prompt comprising a request for a second recipient address of a second address type;
populating the secure communication thread with the prompt; and
in response to receiving the second recipient address of the second address type from the recipient in the secure communication thread:
updating the contact card with a second sender address of the second address type; and
transmitting the contact card to the recipient address.

8. The method of claim 1:
wherein receiving the first electronic communication comprises receiving the first electronic communication comprising a text message; and
further comprising:
in response to failure of delivery of the text message to the recipient address, retrieving a second recipient address comprising a recipient email address;
populating an email with the hyperlink; and
transmitting the email to the recipient email address.

9. The method of claim 8, further comprising:
in response to failure of delivery of the email to the recipient email address, accessing a phone number associated with the recipient;
generating a prompt to call the recipient at the phone number to communicate contents of the text message to the recipient; and
serving the prompt to an operator associated with the sender.

10. The method of claim 1:
wherein receiving the first electronic communication comprises receiving the first electronic communication comprising a text message; and
wherein populating the instance of the secure web portal with the secure communication thread comprises:
accessing a text message history comprising:
a first set of text messages sent from the recipient address and designating the sender; and
a second set of text messages sent from the sender and designating the recipient address;
accessing an email message history comprising:
a first set of emails sent from a second recipient address associated with the recipient and designating the sender; and
a second set of emails sent from the sender and designating the second recipient address;
populating the secure communication thread with the text message history and the email message history based on timestamps of each text in the text message history and each email in the email message history.

11. The method of claim 1, further comprising, in response to the recipient selecting the hyperlink:
retrieving a recipient medical record associated with the recipient;
retrieving a clinical directory associated with the sender;
receiving a second electronic communication from the recipient in the secure communication thread;
extracting a set of language signals from the second electronic communication;
generating a response based on:
the set of language signals;
the medical record; and
the clinical directory; and
populating the secure communication thread with the response.

12. The method of claim 1:
wherein receiving the first electronic communication comprises:
receiving the first electronic communication comprising a first email encrypted according to a first encryption protocol; and
further comprising:
accessing encryption protocols supported by a mail client at the recipient address; and
in response to encryption protocols supported by the mail client excluding the first encryption protocol, associating the recipient address with insufficient messaging security.

13. The method of claim 1, further comprising:
receiving a second electronic communication:
sent by the sender; and
designating a second recipient address associated with a second recipient;
accessing encryption protocols supported by the second recipient address; and
in response to a recipient exclusion list excluding the second recipient address and in response to association of the second recipient address with insufficient communication security:
initializing a third instance of a third secure web portal associated with the second recipient;
initializing a third secure communication thread accessible within the third instance of the third secure web portal;
populating the third secure communication thread with contents of the second electronic communication;
associating the third instance of the third secure web portal and the third secure communication thread with a third hyperlink;

generating a third notification comprising the third hyperlink; and transmitting the third notification to the second recipient address in place of the second electronic communication.

14. The method of claim 13, further comprising:

receiving a third electronic communication:

sent by the sender; and designating a third recipient address associated with a third recipient; and in response to a recipient exclusion list excluding the second recipient address, transmitting the third electronic communication to the third recipient address.

15. The method of claim 1, further comprising associating the recipient address with insufficient communication security in response to detecting absence of end-to-end encryption at a messaging platform associated with the recipient address.

16. A method comprising:

receiving a first electronic communication:

sent by a sender; and designating a first recipient address, of a first communication type, associated with a recipient;

in response to association of the first recipient address with insufficient communication security:

querying a recipient profile for a second recipient address, of a second communication type different from the first communication type, associated with the recipient;

in response to absence of the second recipient address, of the second communication type, in the recipient profile:

initializing an instance of a secure web portal associated with the recipient;

initializing a secure communication thread accessible within the instance of the secure web portal;

populating the secure communication thread with contents of the first electronic communication;

associating the instance of the secure web portal and the secure communication thread with a hyperlink;

generating a notification comprising the hyperlink; and transmitting the notification to the first recipient address in place of the first electronic communication; and in response to selection of the hyperlink at a recipient device:

serving the instance of the secure web portal to a web browser at the recipient device; and loading the secure communication thread into the instance of the secure web portal;

receiving a second electronic communication:

sent by the sender; and designating a third recipient address of the first communication type, associated with a second recipient;

in response to association of the third recipient address with insufficient communication security:

querying a second recipient profile for a fourth recipient address of the second communication type, associated with the second recipient; and in response to presence of the fourth recipient address, of the second communication type, in the second recipient profile and in response to association of the fourth recipient address with sufficient secure communications:

transmitting the second electronic communication to the fourth recipient address in place of transmitting the second electronic communication to the third recipient address.

17. The method of claim 16:

wherein receiving the first electronic communication comprises receiving the first electronic communication designating a recipient phone number; and wherein querying the recipient profile for the second recipient address of the second communication type comprises querying the recipient profile for a recipient email address.

18. The method of claim 16:

wherein receiving the first electronic communication comprises receiving the first electronic communication comprising a text message; and wherein populating the instance of the secure web portal with the secure communication thread comprises:

accessing a text message history comprising:

a first set of text messages sent from the recipient address and designating the sender; and a second set of text messages sent from the sender and designating the recipient address;

accessing an email message history comprising:

a first set of emails sent from a third recipient address associated with the recipient and designating the sender; and a second set of emails sent from the sender and designating the third recipient address; and populating the secure communication thread with the text message history and the email message history based on timestamps of each text in the text message history and each email in the email message history.

* * * * *